United States Patent [19]

Sagues et al.

[11] Patent Number: 5,062,064

[45] Date of Patent: Oct. 29, 1991

[54] METHOD AND APPARATUS FOR MEASURING VELOCITY IN SERVO SYSTEMS

[75] Inventors: Paul Sagues, Berkeley; Vernon E. Muhr, El Cerrito, both of Calif.

[73] Assignee: Berkeley Process Control, Inc., Richmond, Calif.

[21] Appl. No.: 402,058

[22] Filed: Sep. 1, 1989

[51] Int. Cl.[5] .............................................. G01P 3/42
[52] U.S. Cl. ....................................... 364/565; 318/603
[58] Field of Search .................. 364/565, 174, 167.01, 364/176; 318/633, 632, 605, 603

[56] References Cited

U.S. PATENT DOCUMENTS

| | | | |
|---|---|---|---|
| 4,179,656 | 12/1979 | Wagner | 364/565 |
| 4,362,980 | 12/1982 | Itzkowitz | 318/632 X |
| 4,369,884 | 1/1987 | Sagues | 364/565 |
| 4,376,970 | 3/1983 | Ilseman et al. | 364/167.01 |
| 4,918,443 | 4/1990 | Yoshida et al. | 318/603 |
| 4,933,834 | 6/1990 | Gotou et al. | 364/167.01 X |

*Primary Examiner*—Parshotam S. Lall
*Assistant Examiner*—S. A. Melnick
*Attorney, Agent, or Firm*—Owen, Wickersham & Erickson

[57] ABSTRACT

Method and apparatus for measuring the velocity, whether rotary or reciprocating, of a servo shaft driven cyclically by a motor, without employing a tachmometer, while maintaining accuracy despite environmental electrical noise. From movement of the shaft a pair of overlapping square-wave signals in quadrature are produced with transition expressible in Gray Code for each cycle. A clock continuously produces a large number of evenly spaced clock pulses constituting a series of consecutive sample intervals. A signed value representing the algebraic sum of all the quadrature transitions occurring during a sample interval is determined and stored. The number of clock pulses between two quadrature transitions, each transition being the last qualified transition of the two most recent sample intervals having transitions is determined. A computer divides the sample intervals by the number of clock pulses which occurred between the selected quadrature transitions.

27 Claims, 13 Drawing Sheets

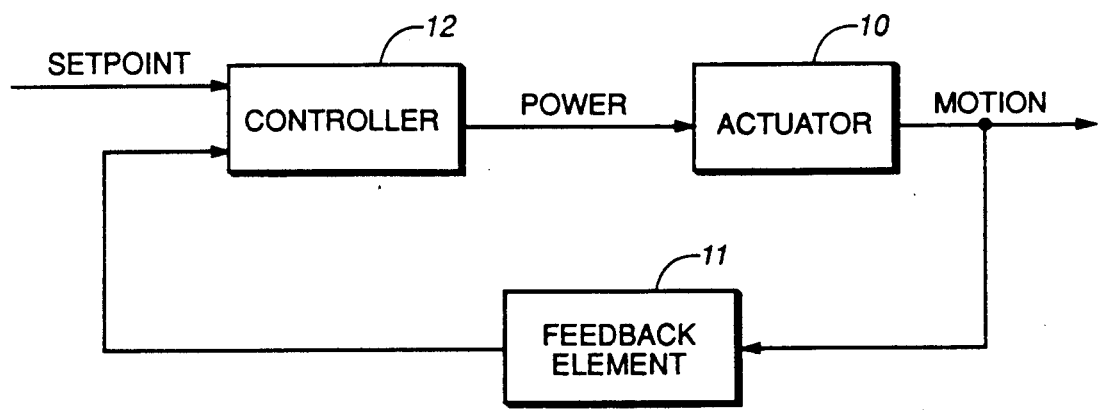
FIG._1
(PRIOR ART)
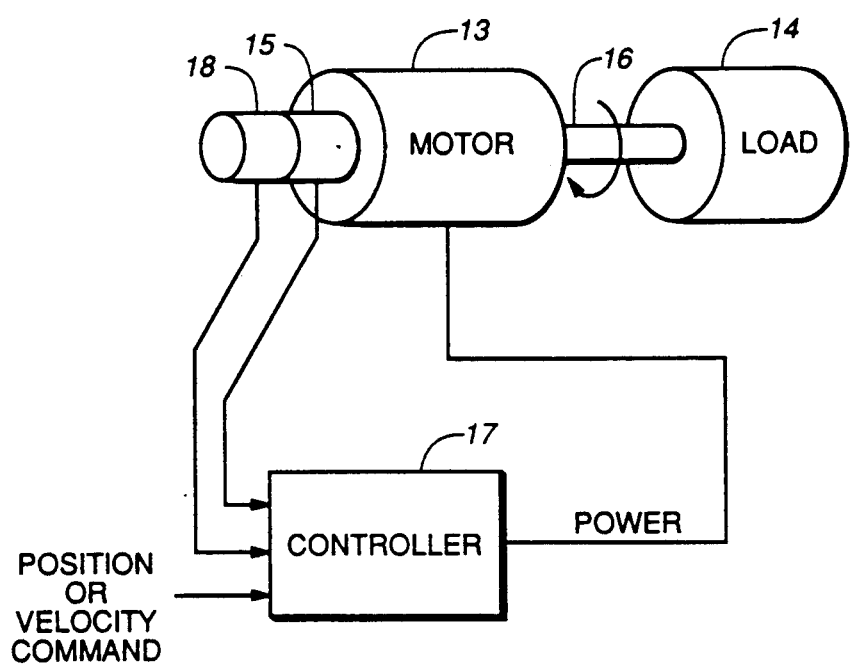
FIG._2
(PRIOR ART)

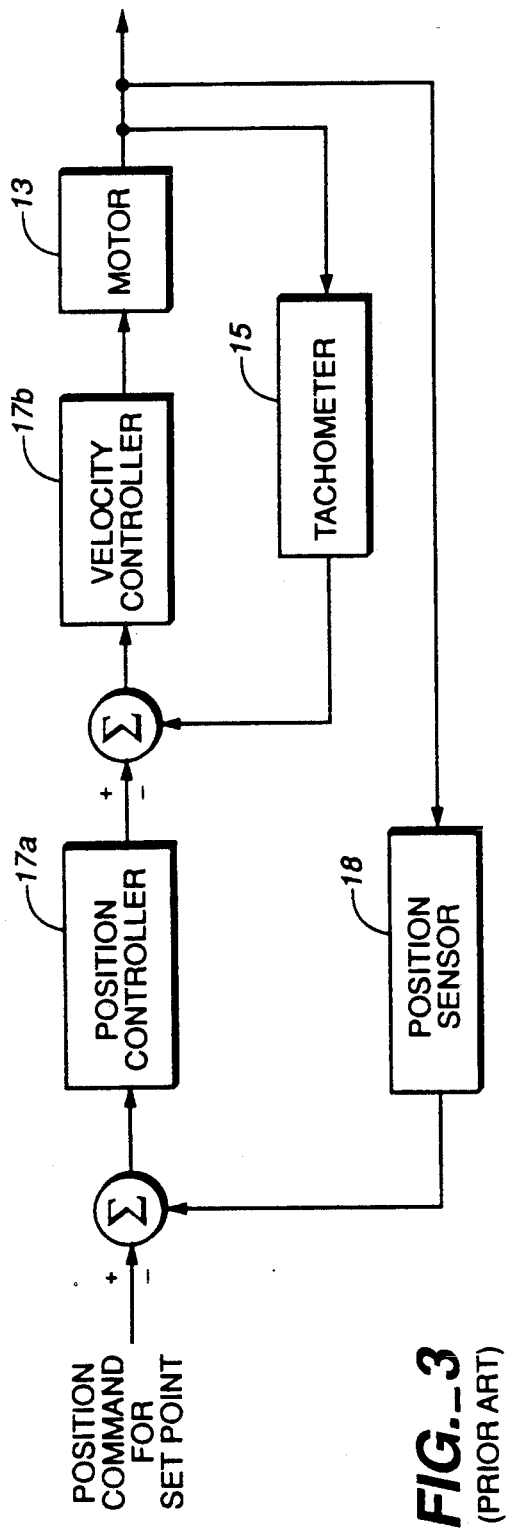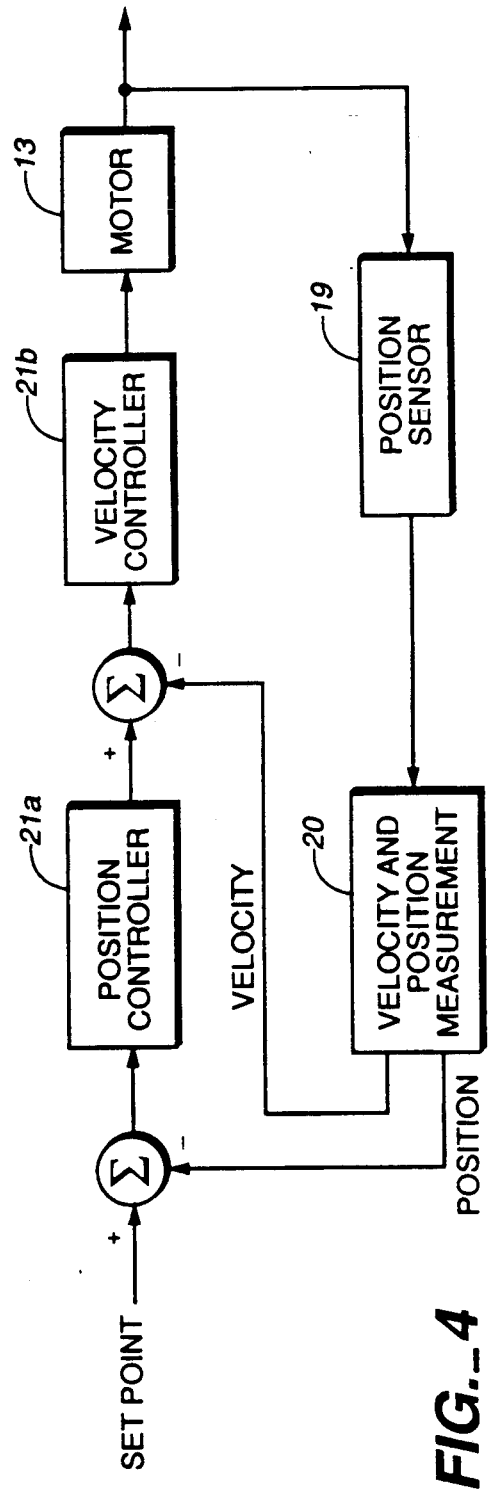
FIG._3 (PRIOR ART)
FIG._4

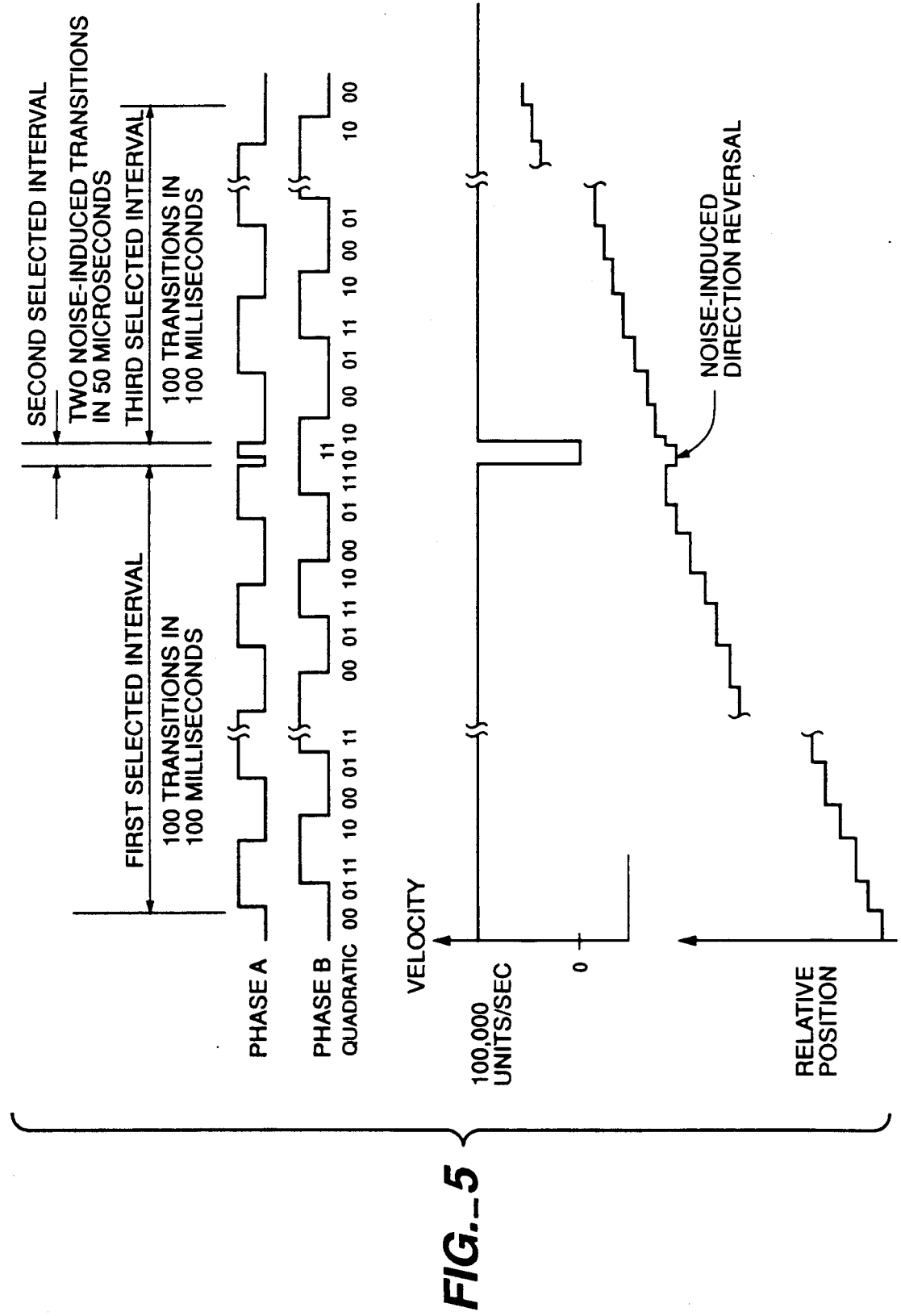
FIG._5

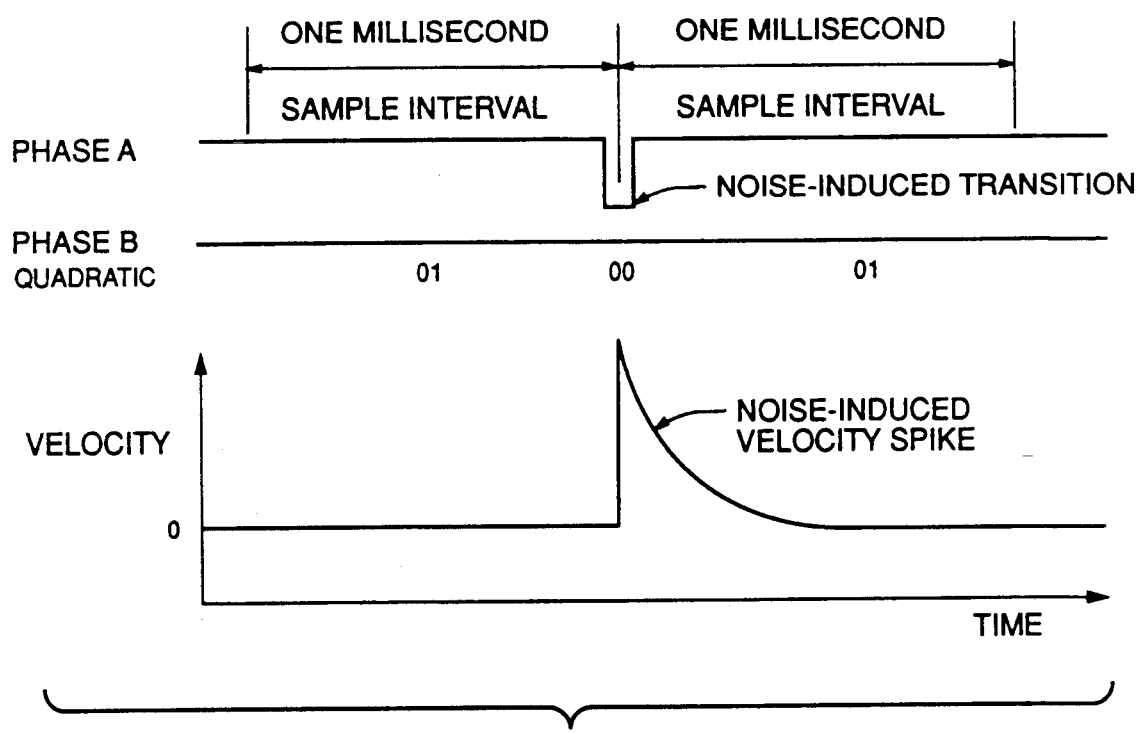
FIG._6

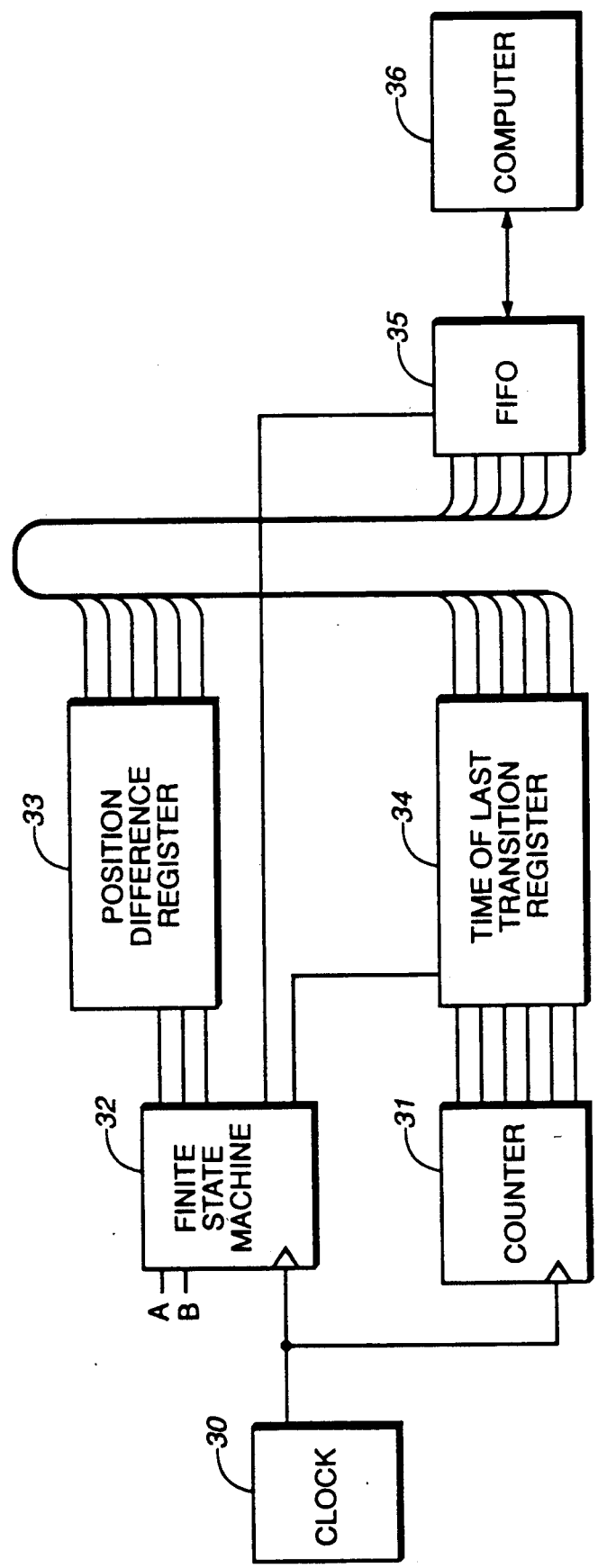
FIG._7

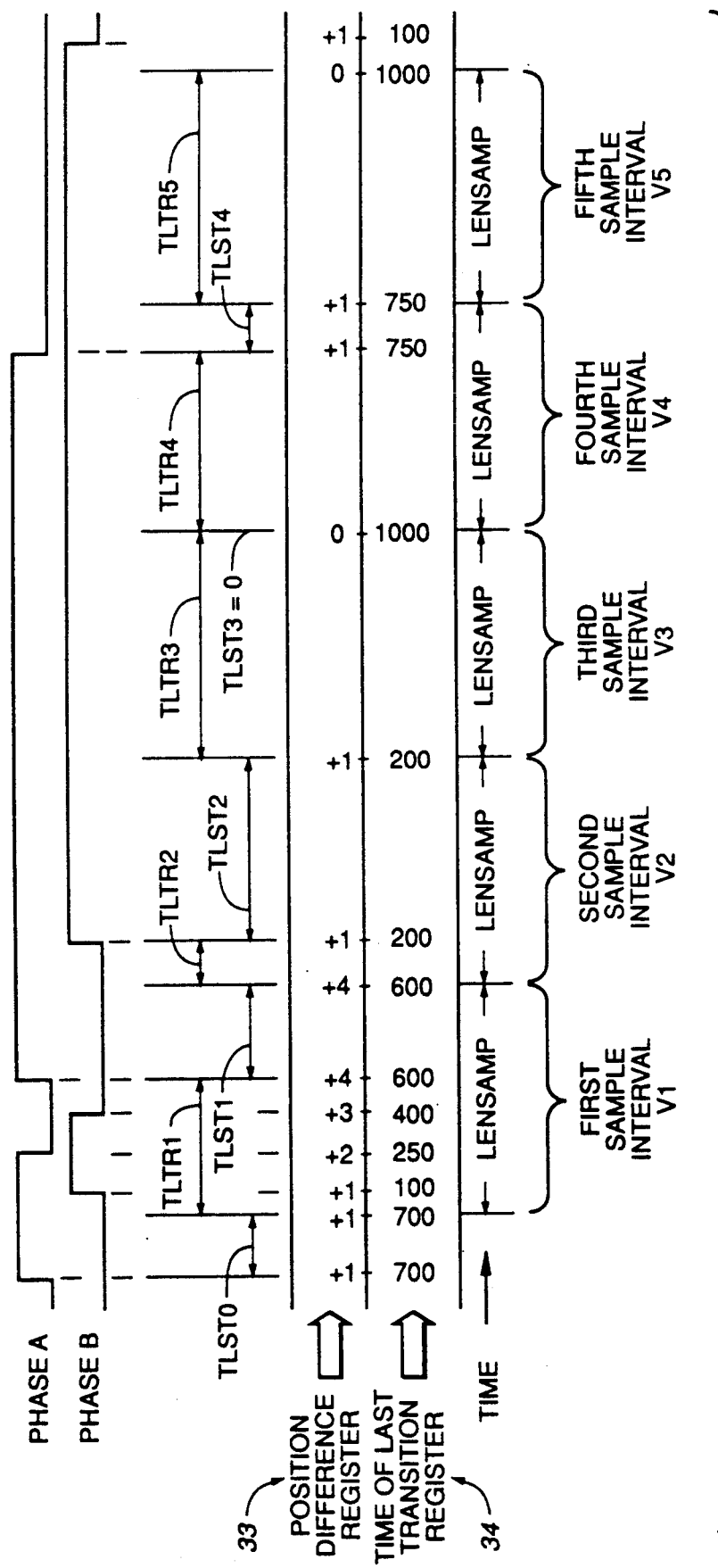
FIG._8

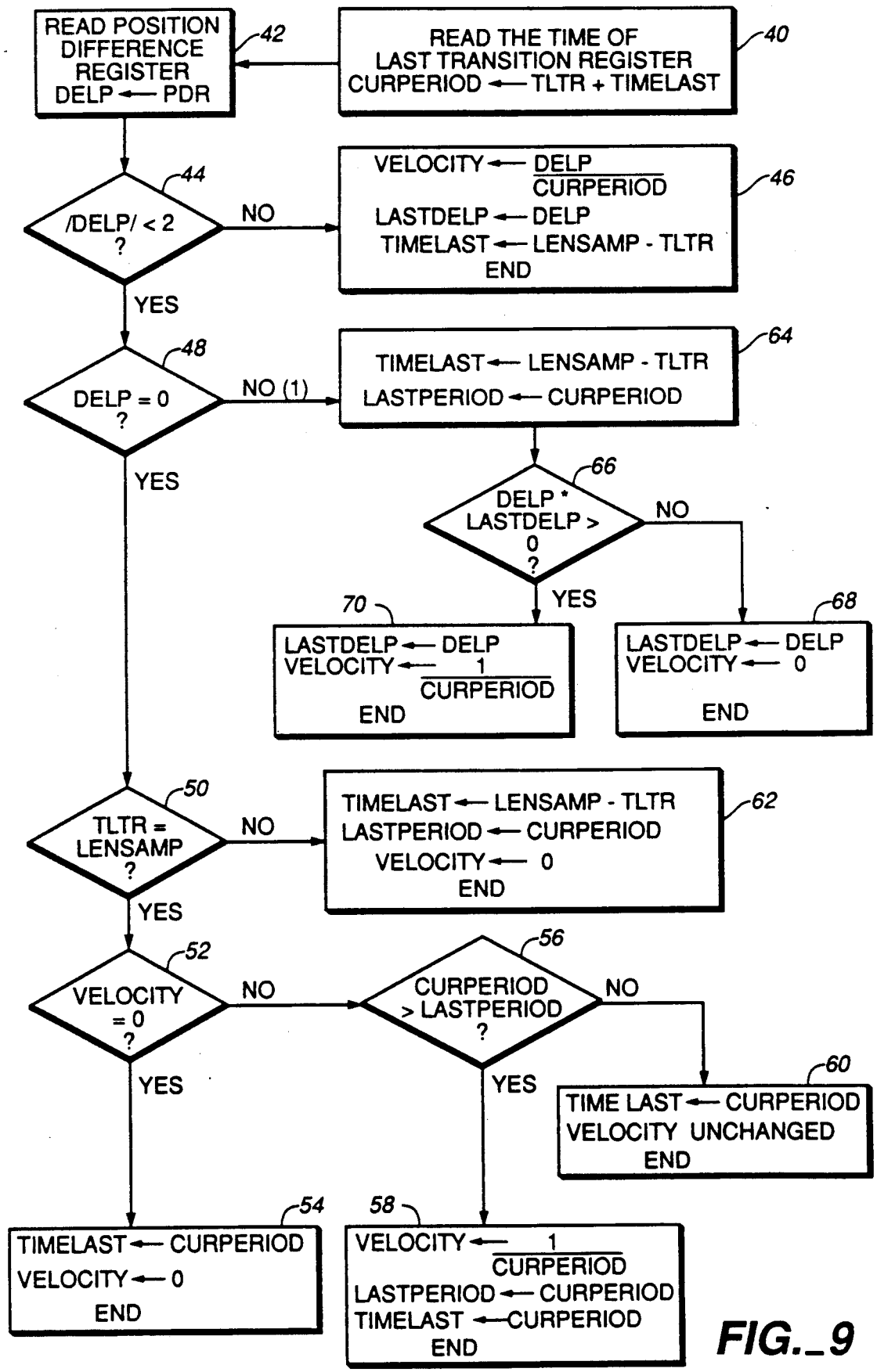
FIG._9

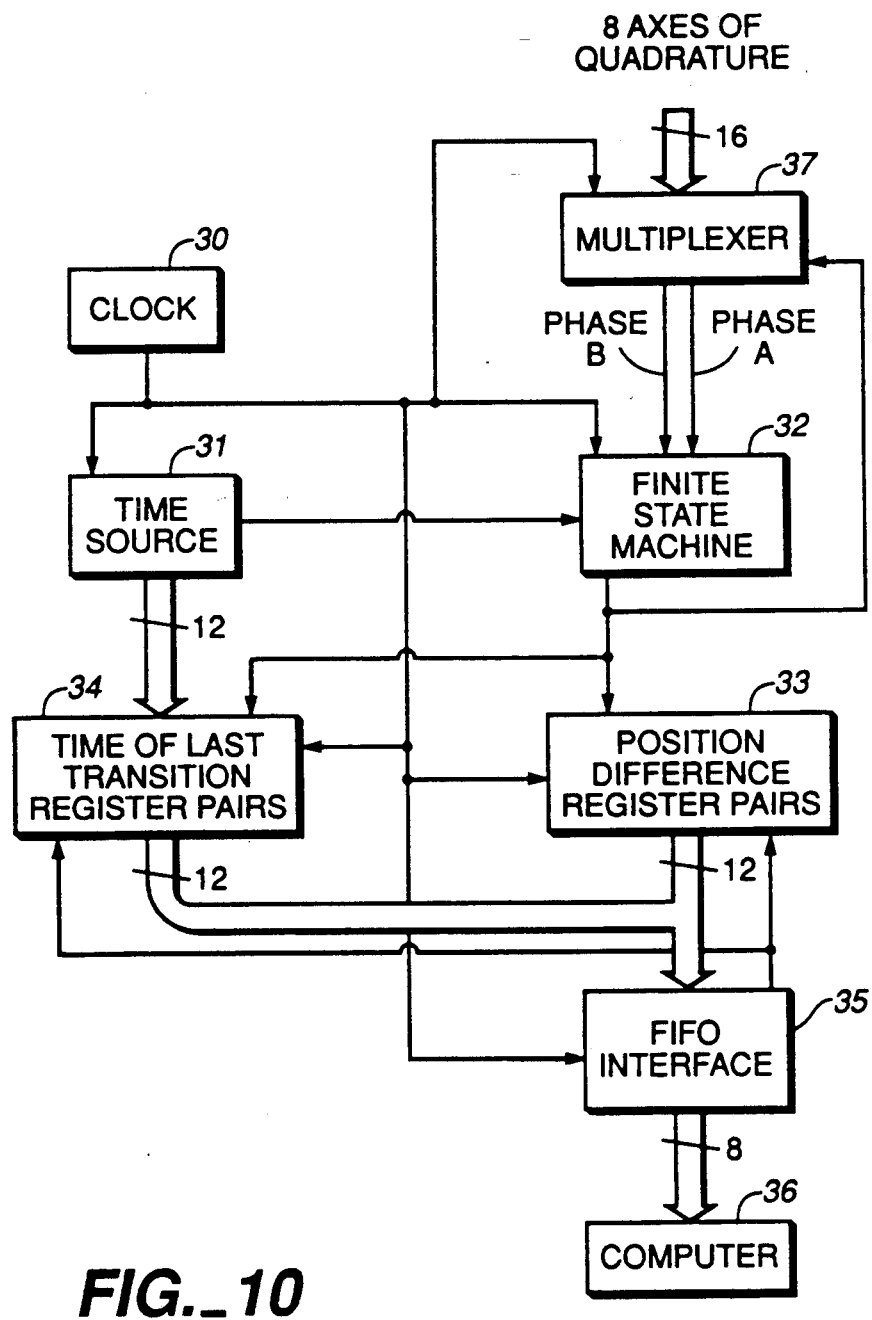
FIG._10

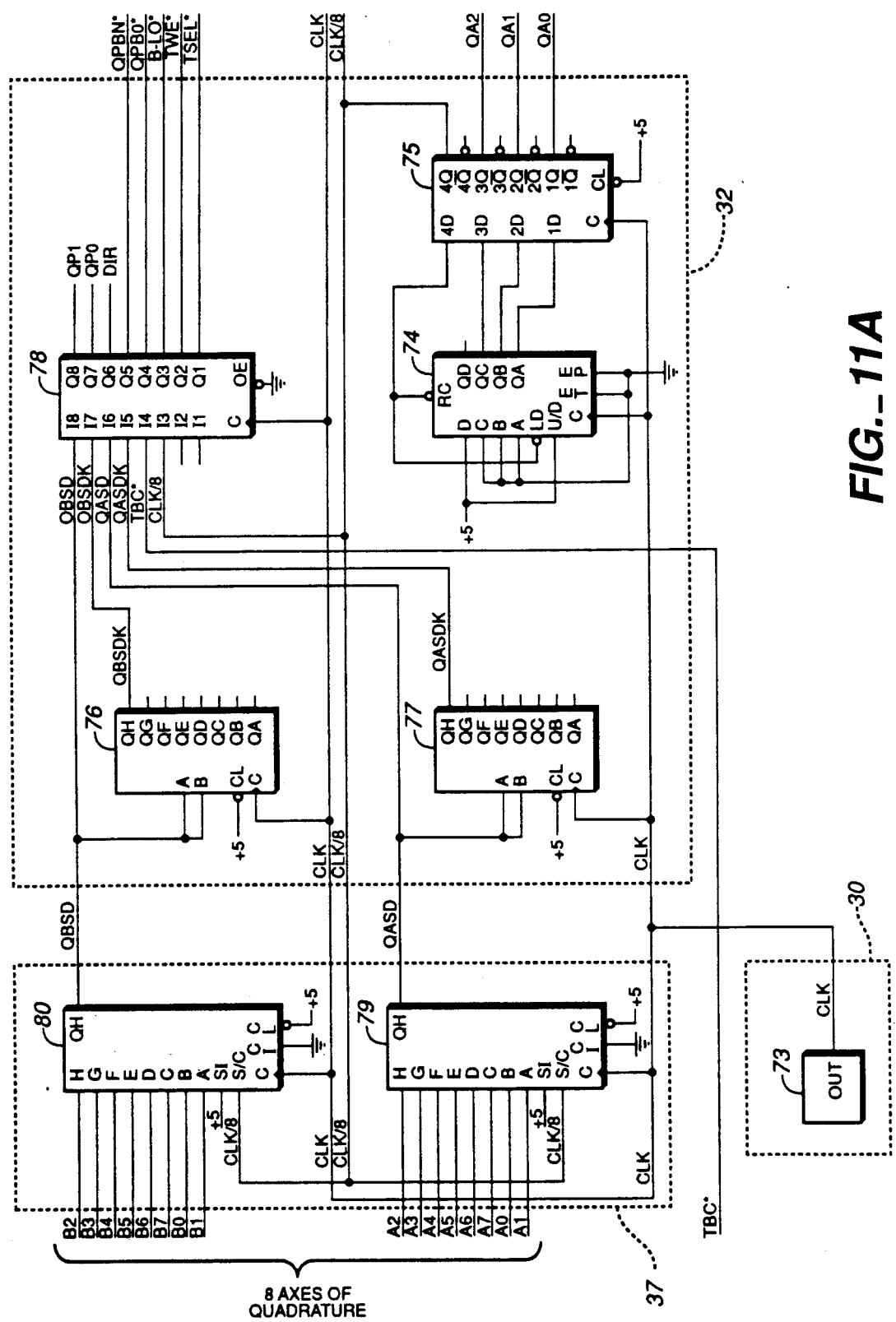
FIG._11A

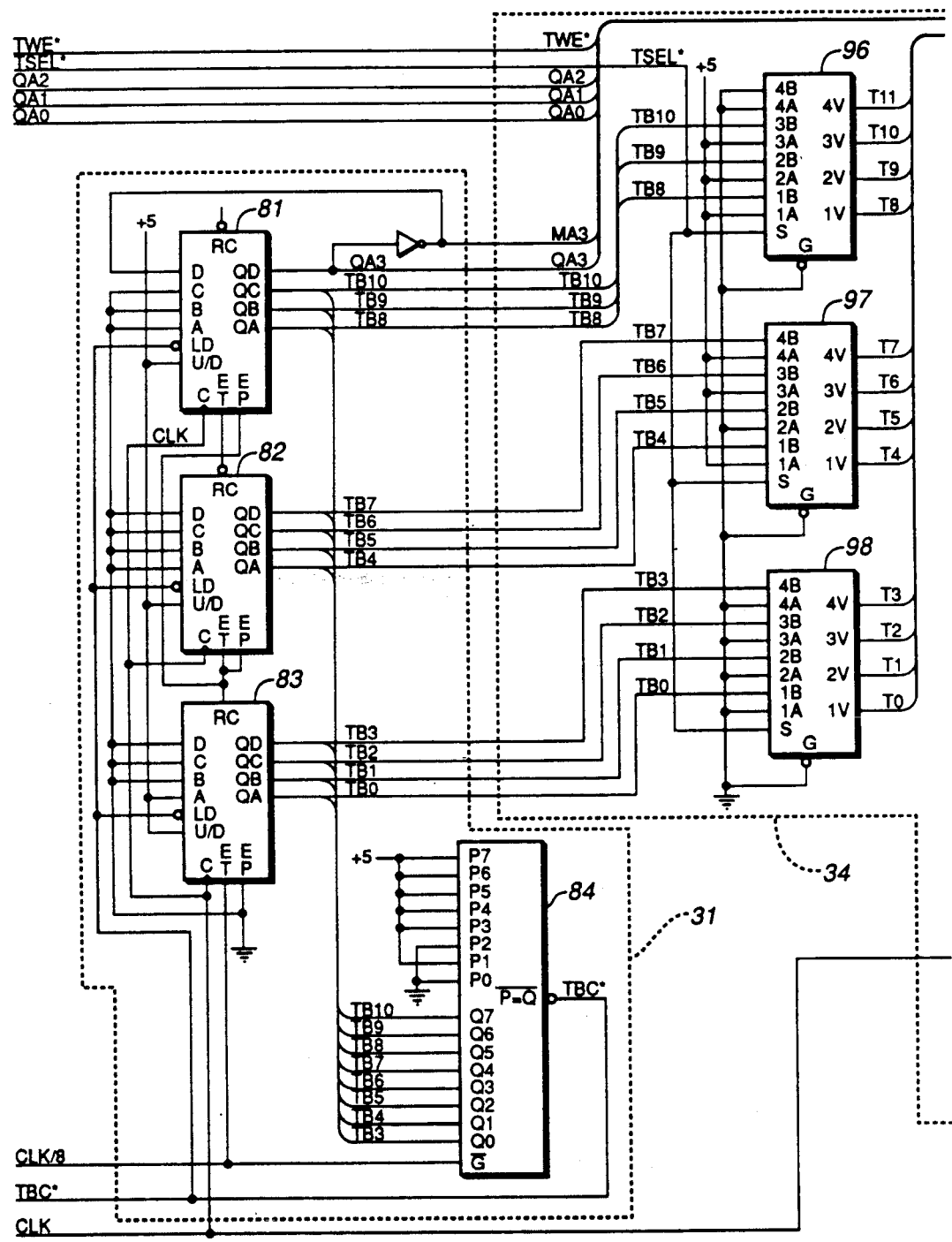
FIG._11B1

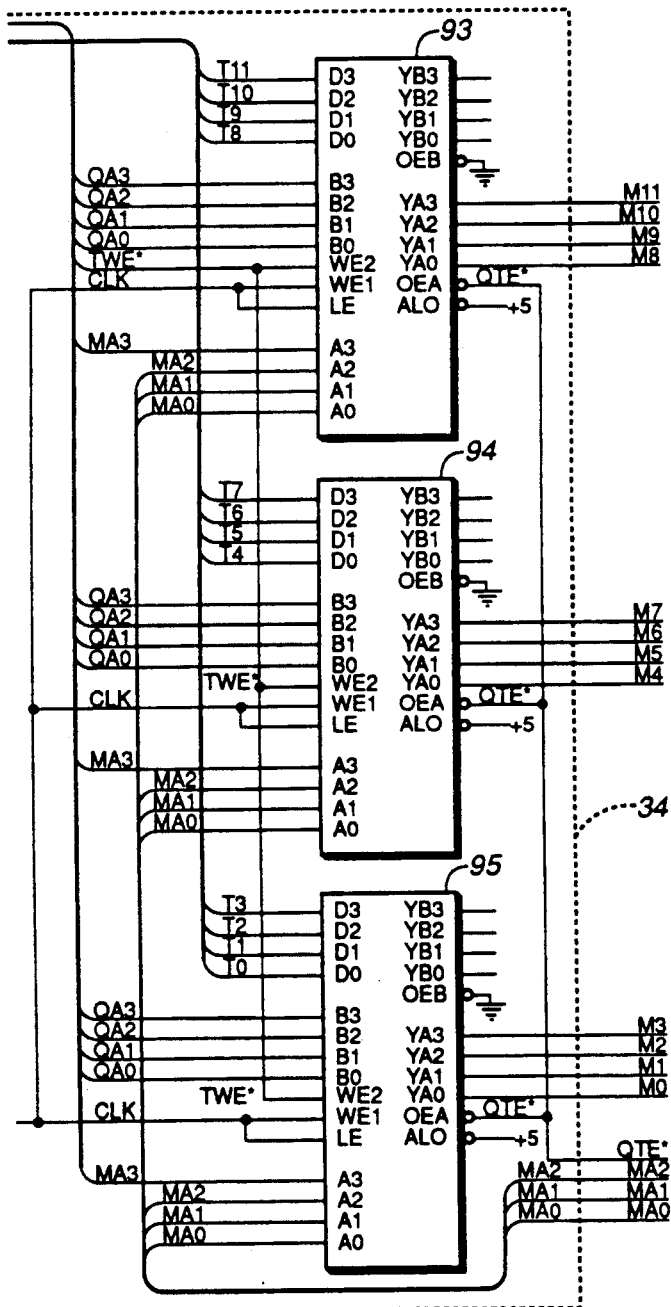
FIG._11B2

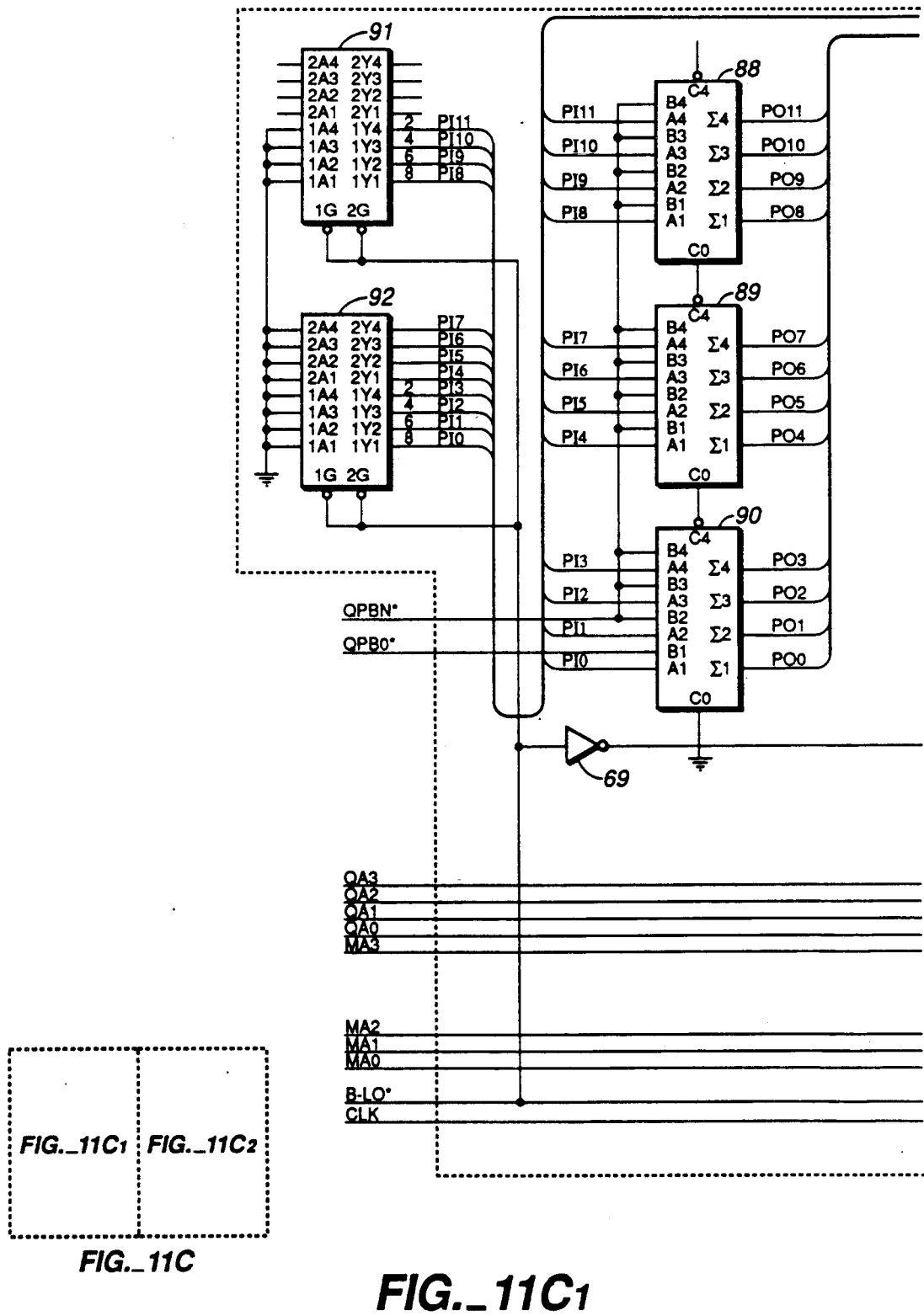
FIG._11C1

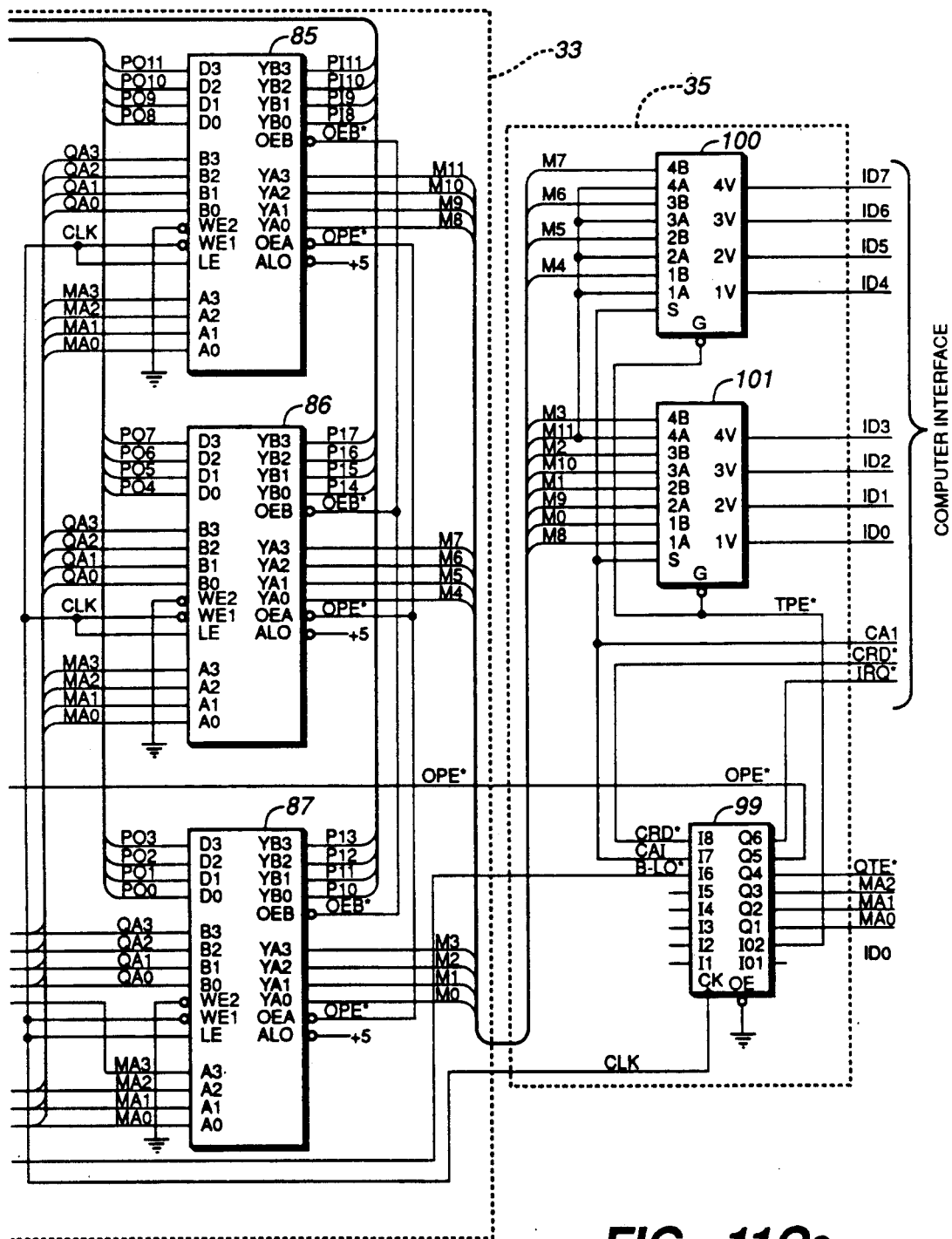
FIG._11C2

METHOD AND APPARATUS FOR MEASURING VELOCITY IN SERVO SYSTEMS

This invention relates to apparatus for and a method of improved servo control.

BACKGROUND OF THE INVENTION

In U.S. Pat. No. 4,639,884, a unique solution to a longstanding problem of measuring precisely the velocity and position of a servo system over a wide range of speeds is disclosed. In accordance with the principles of the invention described in this patent, which is incorporated herein by reference, a servo controller applied to the output shaft of a servo motor employs a rotary-position sensor to produce a two-bit digital signal in Gray Code. As the shaft rotates through a fixed angle, the quadrature signal changes to produce a "quadrature transition", a term used to denote the movement of the rotary-position sensor through an angle that is sufficient to cause the sensor's quadrature output to advance to the subsequent Gray Code pattern. Thus, movement of the shaft (axis) produces a pair of signals in quadrature with transition, expressible in Gray Code for each cycle as 00, 01, 11, 10 and then back to 00. It also produces, as from a clock, a large number of pulses per group of quadrature transitions at all speeds of the shaft. The method continues by reading the number of clock pulses between two selected quadrature transitions, and then determines the velocity by dividing the total number of quadrature transitions between the selected transitions by the total number of clock pulses during the same time.

In the ideal servo system, the overlapping square wave transitions of the feedback system fall precisely at rotary or linear distance intervals of the servo axis. While, for the most part, the approximation is sufficiently precise, there are situations in which a low precision level limits servo axis performance even when using the method and apparatus of U.S. Pat. No. 4,639,884. One intent of the present invention is to improve the measurement method and apparatus to better measure the non-ideal feedback signals, particularly for servo systems subjected to an environment having electrical noise. The term "electrical noise" refers to unwanted transitions of the overlapping square wave signals of the feedback loop. In servo systems, electrical currents in either the feedback loop or the actuator system can inductively or capacitatively couple to circuits within the feedback loop and generate unwanted transitions. The result of the noise is that the transitions of the feedback system do not precisely correspond to the actual motion of the axis.

Significant electrical noise levels are most common in systems with electric actuators such as electric motors. In such cases the power to move the axis is derived from electricity. Pulse-width-modulated semiconductor switches are commonly used to regulate the amount of power delivered to the electric motor. The switching of inductance of the motor with the semiconductors generates large electric currents and magnetic fields. It is these currents and fields which are most often the source of electrical noise in the servo system.

Other sources of electrical noise in servo systems include currents and fields generated by equipment and machines surrounding the servo system. One source common to most servo systems is noise in the feedback system itself. In order to reduce the effects of internal noise, most feedback systems include some amount of electrical hysteresis which manifests itself as a tendency of the overlapping square waves to settle in a stable manner. Electrical hysteresis in the feedback system adjusts the threshold of the sensing element based upon the direction that the threshold is being approached. Some non-ideal feedback systems have low or even negative electrical hysteresis which increases the system's tendency to oscillate about two adjacent Gray Code patterns of the overlapping square wave quadrature signals.

An ideal feedback system should produce transitions of its overlapping square wave signals if and only if the servo axis moves, and also should produce no transitions of its overlapping square wave signals if the axis does not move. In particular, the ideal feedback system should unambiguously signal the change from one discernible position to the next at very low velocities by causing a single transition of the overlapping square waves per position interval or count. In a manner analogous to a wheel of fortune, which is bistable between one number and the next, the ideal feedback system should slow and stop at a given position without continuing to bounce between one of two Gray Code quadrature states or position counts.

How Electrical Noise can Affect the Ideal Feedback Signal

A real feedback system can behave in a non-ideal fashion because of the ability of noise to disturb the measurement made by the feedback system. The real feedback system contains some form of electrical circuit which performs a measurement on the mechanical motion. A common method is to measure the obstruction of light by a series of dark lines etched on a piece of glass placed between a light source and two light sensors separated by ninety electrical degrees. As the line begins to occlude one of the sensors, the light sensor threshold is exceeded and the sensor signals the movement of the glass disk or rail. The signal thus indicates movement of the axis. If electrical circuits or magnetic fields not a part of the light and light sensor are allowed to modulate the intensity of the light or the threshold of the light sensor, then the feedback system can oscillate between two adjacent feedback transition states or Gray Code states.

Just as a wheel of fortune which continues to oscillate between two adjacent numbers will cause ambiguity in the resolution of the game of fortune, so the continued oscillation of the feedback system between two adjacent Gray Code states causes ambiguity as to the position and velocity of the axis. This phenomenon can occur either when the servo output shaft is in motion or at rest.

It is, therefore, one object of the present invention to better interpret the ambiguous signals from the non-ideal feedback system in order to increase its accuracy and precision. Another general object of the invention is to improve the measurement of the velocity and position of a servo system in the presence of electrical noise and, more specifically, to resolve the apparent ambiguities inherent in the two examples of electric noise described below.

Another object of the invention is to provide an improved servo system that measures velocity and position of an output element with greater accuracy and precision under conditions where the velocity is changing rapidly. The present system is able to do this because it better selects the two quadrature transitions used in velocity determination. This system still uses the number of transitions divided by time, but in the present case, the transitions selected are those which immediately precede the ends of the sample interval.

Still another object of the present invention is to provide a velocity and position control system for a multi-axis servo system which is highly accurate and precise even when operating in the presence of electrical noise.

SUMMARY OF THE INVENTION

In accordance with the principles of the invention a combination of hardware and micro-processor-driven software comprises an improved method and a machine capable of highly accurate velocity and position measurements in a servo system under various operating conditions and in the presence of an electrical noise environment. In general, the present invention is applied to a servo controller which does not include a tachometer, but measures the time between quadrature transitions in a unique manner to provide reliable velocity measurements.

As applied to a rotary shaft, the invention employs a rotary-position sensor which produces what is known as "discrete quadrature", which is a two-bit digital signal in Gray Code. As the rotary-position sensor rotates through a fixed angle, the quadrature signal changes. The term "quadrature transition" is used to refer to the movement of the rotary-position sensor through a sufficient angle for the sensor's quadrature output to advance to the subsequent Gray Code pattern. A group of quadrature transitions is two or more quadrature transitions. The term "count" or "position count" means the rotary-position sensor's shaft angle between subsequent quadrature transitions. The term "position" means the number of position counts from a reference zero count. The term "velocity" then means the number of counts per second at which the rotary-position sensor is turning.

The present invention provides for sample intervals, nominally coincident with the sampling frequency of the servo controller. During the sample interval, the invention provides means for recording the time at which feedback system Gray Code transitions occur. The sample interval is usually about one millisecond and the Gray Code transitions are evaluated roughly every microsecond. At the end of each sample interval, a microprocessor evaluates the probable velocity based upon the difference in position between the start and end of the sample interval and the time at which the last transition occurred. Because the microprocessor preserves the sampled values from one sample interval to the next, the velocity can be computed in a manner similar to that of U.S. Pat. No. 4,639,884. However, the fact that the time of every quadrature transition is recorded allows the microprocessor to better select the quadrature transitions to employ in the velocity calculation. By so doing, the invention allows the microprocessor to better reduce the effects of electrical noise on the measurement.

The invention thus includes a method for measuring the velocity of a servo shaft driven cyclically by a motor, without employing a tachometer. The method begins by producing from movement of the shaft (axis) a pair of signals in quadrature with transitions expressible in Gray Code for each cycle as 00, 01, 11, 10 and then back to 00. Simultaneously produced, as from a clock, are a large number of evenly spaced pulses designating a selected number of clock pulses, commencing with an initial pulse, as a sample interval. The method continues by reading the number of clock pulses between the last quadrature transition of the previous sample interval (if one occurred) and the last transition of the present sample interval, and then determines the velocity by dividing the total number of quadrature transitions between the selected transitions by the total number of clock pulses during the same time.

More specifically, the method comprises reading through a FIFO (first-in, first-out) memory a first time when a selected quadrature transition occurred, subtracting from said first time a second time of a preceding selected quadrature transition in order to obtain the number of clock pulses between two selected quadrature transitions.

When the method is applied to a plurality of different servo shafts, it provides for multiplexing the input quadrature and latching in the FIFO the identity of each shaft to the counts and quadrature identities applying to it. The method applies both to a rotating shaft and a reciprocating shaft, and it includes determining from the sequence of the Gray Code transitions the direction of shaft movement.

In terms of hardware, the present invention comprises a first register means for recording the time of each quadrature transition (i.e. the number of clock ticks since the beginning of the sample interval) of the feedback system Gray Code within a predetermined sample interval which is used in the determination of velocity and position. This differs from the procedure in my prior art U.S. Pat. No. 4,639,884 which required that the quadrature transitions to be recorded had to be selected in advance. The present invention also includes a second register for recording the difference in Gray Code position counts between the starting and ending of a sample interval. After each sample interval, a computer means is utilized for reading and recording the time of the last Gray Code transition and the difference in Gray Code transitions over the course of the sample interval. The computer means further includes means for deducing the likely velocity of the axis given that there may be more than one interpretation of the time and position information. When the apparatus is used with a plurality of shafts, a multiplexing means is also provided for significantly reducing the circuitry required for multiple axis servo systems embodying the invention.

Other objects, advantages and features of the invention will become apparent from the following detailed description, presented in conjunction with the accompanying drawing.

BRIEF DESCRIPTION OF THE DRAWING

FIG. 1 is a block diagram of the main elements of a conventional servo system.

FIG. 2 is a diagrammatic representation of a prior art servo system employing a tachometer.

FIG. 3 is a block diagram of a prior art servo system utilizing a tachometer.

FIG. 4 is a block diagram of a servo system having a velocity and position measurement apparatus according to the present invention.

FIG. 5 is a diagram illustrating a first case example of the effect of electrical noise on a servo system wherein the shaft is in motion.

FIG. 6 is a diagram illustrating a second case example of the effect of electrical noise on a servo system wherein the shaft is at rest.

FIG. 7 is a block diagram of a simplified velocity and position measurement apparatus used in the servo system of FIG. 4 and embodying principles of the present invention.

FIG. 8 is a time chart depicting phase transitions during a series of sample intervals to illustrate velocity computation in a servo system according to the invention.

FIG. 9 is a flow chart showing the logic determination of axis velocity for the "at rest" electrical noise case of FIG. 6 according to the invention.

FIGS. 10 is a schematic diagram of a multi-axis apparatus embodying principles of the invention.

FIGS. 11A, 11B, 11B1, 11B2, 11C, 11C1 and 11C2 comprise an expanded circuit and schematic diagram for the multi-axis apparatus of FIG. 10.

EXPLANATION OF THE PRIOR ART

FIG. 1 summarizes the main elements of a closed loop servo control system which are important for the discussion of this invention. A preferred feedback element 11 measures the position or velocity, or both—and is connected to a controller 12 which applies power to the actuator 10 in order to effect a desired motion goal or controller setpoint, such as desired position, velocity, or acceleration.

FIG. 2 depicts a servo system using a tachometer illustrative of the prior art. A DC electric motor 13 drives a load 14. The motor 13 also drives a tachometer 15 which produces a signal proportional to the rotational velocity of a shaft 16. A controller 17 uses the signal from the tachometer 15 to measure the velocity of the load 14. A rotary position feedback system or encoder 18 allows the controller 17 to determine the position of the load 14. The controller 17 accepts, commands and controls the speed or position of the load 14.

FIG. 3 is a controller block diagram which is typical of one form of the prior art used for closed-loop servo control. Other controller configurations are possible, but they would be similar in their use of a signal from a motor speed sensor (tachometer) 15 and a position sensor 18. In FIG. 3, a two-part controller 17a, 17b is given a desired position and determines the position error by taking the difference between the desired position and the actual position as measured by the position sensor 18, which is the rotary position feedback element. The position controller 17a uses this position error to generate a desired velocity: that is, as the position error decreases, so does the desired velocity signal to determine the value of the motor actuation signal. Servo control systems using a control strategy such as this are used in a myriad of industrial process control applications.

FIG. 4 is a controller block diagram which is typical of servo systems utilizing the method and apparatus of the present invention. In this preferred embodiment, a position sensor 19 produces overlapping square wave signals in quadrature which are processed by a block 20 embodying the method and apparatus of the present invention to produce both velocity and position signals. The position signal is furnished to a summation component which is also supplied with a set point input. The position controller 21a uses the error in position between the setpoint and the position produced by the method and apparatus 20 to generate a desired velocity. This desired velocity signal is furnished to another summation component which compares it with the velocity output from the apparatus block 20 to provide an input to a velocity controller 21b. The velocity controller 21b then uses the desired velocity and the processed signal from the block 20 to determine the value of an actuation signal for the servo motor 13.

When a servo axis controlled by the apparatus of FIG. 4 is moving uniformly in one direction, it is expected that the Gray Code sequence of phase A and B signals emitted by the feedback system will be monotonic, for example 00, 01, 11, 10, 00, 01, and so forth. The computed velocity would then be monotonic and a graph of velocity versus time would be monotonic. The rate of change of the slope of the velocity versus time curve would not change sign. However, as previously described, electrical noise heretofore created a problem with respect to accurate velocity measurement.

In a first numerical example of electrical noise, as shown in FIG. 5, the servo axis is first moving uniformly in one direction during a first selected interval. Now, the effects of electrical noise cause the Gray Code sequence emitted by the feedback to be, for example, 00, 01, 11, 01, 11, 10, 00, 01, creating an ambiguity in the sequence 01, 11, 01, 11. This erroneous sequence implies that the axis stopped, moved backwards, stopped again, and then moved forward again when, in fact, no actual shaft reversal occurred. In order for this sequence to have occurred, the sign of the velocity would have had to have reversed twice. For example, assume one hundred monotonic Gray Code sequences occurred in an arbitrary positive direction in one hundred milliseconds during a first selected interval, and then one backward and one forward transition occurred in 50 microseconds, (designated as a second selected interval) followed by another one hundred more monotonic Gray Code sequences in the same positive direction during the following one hundred milliseconds (the third selected interval). A prior art system for this data normally would have computed a velocity of 100 transitions or counts divided by the precise number of clock ticks during the first one hundred milliseconds and a velocity of zero for the second selected interval or the 50 microsecond interval between the two monotonic sequences of Gray Code. Thus, the effect of the electrical noise on the feedback signal in this example would be to cause the apparatus to compute a non-monotonic velocity with respect to time which would cause the axis to jerk. The measurement of velocity using the prior art did not filter out the noise effect, but instead propagated the noise originating in the feedback system and degraded the performance of the entire servo system causing the machine, or process controlled thereby, to perform undesirably.

A second numerical example of the effect of electrical noise may be explained by reference to FIG. 6. Assume that a servo axis is at rest and that the feedback system is physically positioned adjacent to the point at which a transition of the overlapping square waves is to occur For example, in the case of the optical sensor with etched lines on the glass, assume one line is partially obstructing the optical sensor which is close to its electrical threshold. The output of the feedback system is initially unchanging, reflecting the fact that the axis of motion is at rest.

Now, when that electrical noise affects the feedback system, e.g. if there is a slight change in the power supplied to the electric drive motors, despite the fact that the axis does not move, the noise will cause the feedback sensor to make two noise induced transitions between adjacent Gray Code values for example 01, 00, 01. Assume further that the source of the electrical noise was the pulse-width-modulated power transistors of an electric motor amplifier. If, for example, the switching frequency of the motor amplifier is 20 KHz (twenty thousand cycles per second), then the period of the noise-induced Gray Code transitions as measured by prior art apparatus would be 50 microseconds (0.000050 second). If the prior art apparatus selected the two noise induced transitions 01 to 00 and 00 to 01 and computed a velocity from these two transitions, the velocity would be one divided by the number of clock ticks between them. The prior art apparatus would therefore measure a velocity essentially identical to the frequency of the motor amplifier power switching, or 20,000 transitions or counts per second. This incorrectly measured velocity would subsequently cause the servo control to mistakenly react to the noise induced transitions and attempt to correct the position of the axis at rest The axis would jump and possibly cause damage to the servo system or cause an undesired change in position when the output shaft resumed its motion. The present invention greatly reduces the effect of this type of electrical noise.

DETAILED DESCRIPTION OF EMBODIMENT

With further reference to the drawing, FIG. 7 shows diagrammatically a simplified form of a velocity and position generator 20 embodying principles of the invention.

A clock 30 synchronizes a time source or counter and a finite state machine 32 to which overlapping square wave signals (A, B) in quadrature are applied. The finite state machine 32 controls a position difference register pair 33 and a time of last transition register pair 34.

The position difference register pair 33 and the time of last transition register pair 34 are each made up of a working register which is used in the accumulation of a value for the current sample interval, and a holding register which holds the final value from the previous sample interval.

At each transition (tick) of the clock 30, the time source 31 increments and the finite state machine 32 evaluates the state of the quadrature signals. If a transition of the quadrature has occurred, the finite state machine 32 causes the current time of the time source 31 to be latched by the working register of the time of last transition register pair 34 and simultaneously causes the working register of the position difference register pair 33 to be either increased or decreased by one, depending upon the direction of motion indicated by the quadrature signals. The position difference value is represented in so called "two's complement" form which preserves the sign of the position difference, either positive or negative.

At the transition of the clock 30 which begins a new sample interval, the finite state machine 32 causes the working registers of the time of last transition register pair 34 and the position difference register pair 33 to become holding registers, and simultaneously causes the holding registers of the time of last transition register pair 34 and the position difference register pair 33 to become working registers.

If a transition of the quadrature has not occurred, the finite state machine 32 causes the length of the sample interval to be stored in the working register of the time of last transition register pair 34 and simultaneously causes zero to be stored in the working register of the position difference register pair 33.

If a transition of the quadrature has occurred, the finite state machine 32 causes the value "one" to be stored in the working register of the time of last transition register pair 34 and simultaneously causes the working register of the position difference register pair 33 to be loaded with either positive "one" or negative "one" depending upon the direction of motion indicated by the quadrature signals.

A FIFO interface 35 is connected to receive the outputs of registers 33 and 34. At some instant after the transition of the clock which begins a new sample interval and before the end of the sample interval, the FIFO interface 35, as requested by a computer 36, causes the values stored in the holding registers of the time of last transition register pair 34 and the position difference register pair 33 for each axis to be transferred to the computer 36.

FIG. 8 is a time chart showing a typical series of sample intervals which illustrate the operation of the servo system 20 according to the present invention. It depicts a series of Phase A and B Gray Code quadrature transitions as may be generated by such a system and further depicts the intervals and variables used to compute the velocities of the gray code series at each of five complete sample periods.

Typical outputs from the position difference register 33 and the time of last transition register 34 (shown in FIG. 7) during the sample intervals are depicted, and the method for computing the position and velocity of the axis at the end of each sample interval employing the contents of these two registers is described.

In the example shown, assume that the apparatus clock ticks at the rate of one thousand per sample interval and the clock rate is one million ticks per second. Therefore, the sample interval is one thousand microseconds or one millisecond (0.001 second). Also, (reading from the left to the right in FIG. 8) assume that the measured axis position is one position count at the start of the first sample interval; that one transition occurred during the sample interval immediately preceding the first sample interval; and that one transition occurred at time 700 with respect to the start of the sample interval immediately preceding the first sample interval. In the FIG. 8 chart, the term TLTR refers to the time from the beginning of a sample interval to the last transition in that interval; TLST refers to the time from the last transition in a sample interval to the end of that interval; DELP refers to the difference in position or number of transitions in a sample interval; and LENSAMP is the length of a sample interval. The computer variable $TLST_0$ therefore contains the value $1000-700=300$ at the end of the sample interval immediately preceding the first sample interval.

The First Sample Interval

Four quadrature transitions occur during the first sample interval. Upon the first transition, the apparatus increases the position difference register from zero to one and records the time of last transition in the time of last transition register as 100 clock ticks. Upon the second transition, the apparatus increases the position difference register from one to two and records the time as 250 clock ticks. Upon the third transition, the apparatus increases the position difference register from two to three and records the time as 400 clock ticks. Upon the fourth transition, the apparatus increases the position difference register from three to four and records the time as 600 clock ticks.

At the end of the first sample interval, the computer computes the velocity as the number of quadrature transitions occurring during the first sample interval divided by the time interval from the last transition of the sample interval immediately preceding the first sample interval to the time of the last transition of the first sample interval. Thus:

$$V_1 = \frac{DELP_1}{TLST_0 + TLTR_1} =$$

$$V_1 = \frac{4}{300 + 600} = 0.00444 \text{ counts/second}$$

In the computer 35, all velocity computations are actually performed to a greater precision than the three significant figures shown here. The computer then updates axis position as $1+4=5$ position counts. (Recall that the measured axis position was assured to be one position count at the start of the first sample interval.) Finally, $TLST_1$ is computed as $1000-TLTR_1$ which is $1000-600$ or $400$. $TLST_1$ will now be used in the computation of the velocity during the second sample interval. The apparatus then sets the position difference register to zero.

The Second Sample Interval

One quadrature transition occurs during the second sample interval. Upon the transition, the apparatus increases the position difference register from zero to one and records the time of last transition (TLTR$_2$), in the time of last transition register as 200 clock ticks.

At the end of the second sample interval, the computer computes the velocity as the number of quadrature transitions occurring during the second sample interval divided by the time interval from the last transition of the sample interval (TLST$_1$) immediately preceding the second sample interval to the time of the last transition of the second sample interval. Thus:

$$V_2 = \frac{DELP_2}{TLST_1 + TLTR_2} =$$

$$V_2 = \frac{1}{400 + 200} = 0.00167 \text{ counts/second}$$

The computer then updates axis position as $5+1=6$ position counts. Finally, $TLST_2$ is computed as $1000-TLTR_2$ which is $1000-200$ which is $800$. $TLST_2$ will be used in the computation of the velocity during the third sample interval.

The Third Sample Interval

No quadrature transitions occur during the third sample interval.

At the end of the third sample interval, the computer determines that the position difference register is zero. The computer then examines the time of last transition register and determines that the register contains the length of the sample interval or 1000 indicating that no transitions occurred. (If the time of last transition register had not been equal to the length of the sample interval, then the computer would have deduced that transitions algebraically summing to zero had occurred.) The computer then determines the period of time from the last transition of the second sample interval to the end of the third sample interval. The period is TLST$_2$ +TLTR$_3$ which is $800+1000=1800$. Because 1800 is larger than the previous period of 600 for the third sample interval, the computer then begins to estimate the velocity by assuming that a transition had occurred coincident with the end of the third sample interval. The computer therefore computes the velocity as:

$$V_3 = \frac{1}{TLST_2 + TLTR_3} =$$

$$\frac{1}{800 + 1000} = 0.000556 \text{ counts/second}$$

The computer then updates axis position as $6+0=6$ position counts since no transitions occurred during the third sample interval. Finally, $TLST_3$ is computed as $1000-TLTR_3$ which is $1000-1000$ which is 0. $TLST_3$ will be used in the computation of the velocity during the fourth sample interval.

The Fourth Sample Interval

One quadrature transition occurs during the fourth sample interval. Upon the transition, the apparatus increases the position difference register from zero to one and records the time of last transition in the time of last transition register as 750 clock ticks.

At the end of the fourth sample interval, the computer computes the velocity as the number of quadrature transitions occurring during the fourth sample interval divided by the time interval from the last transition of the sample interval immediately preceding the fourth sample interval to the time of the last transition of the fourth sample interval. This computation is:

$$V_4 = \frac{DELP_4}{TLST_2 + TLTR_3 + TLTR_4} =$$

$$\frac{1}{800 + 1000 + 750} = 0.000392 \text{ counts/sec.}$$

The computer then updates axis position as $6+1=7$ position counts. Finally, $TLST_4$ is computed as $1000-TLTR_4$ which is $1000-750$ which is 250. $TLST_4$ will be used in the computation of the velocity during the fifth sample interval.

The Fifth Sample Interval

No quadrature transitions occur during the fifth sample interval.

At the end of the fifth sample interval, the computer determines that the position difference register is zero. The computer then examines the time of last transition register and determines that the register contains the length of the sample interval or 1000 indicating that no transitions occurred. (If the time of last transition register had not been equal to the length of the sample interval, then the computer would have deduced that transitions algebraically summing to zero had occurred.) The computer then determines the period of time from the last transition of the fourth sample interval to the end of sample interval number five. The period is TLST$_4$ +TLTR$_5$ which is $250+1000=1250$. Because 1250 is smaller than the previous period of 2550 for the fourth sample interval, the computer then cannot estimate the velocity by assuming that a transition had occurred coincident with the end of the fifth sample interval. The computer therefore leaves both the velocity and position unchanged for the fifth sample interval.

Finally, TLST₅ is computed as 1000−TLTR₅ which is 1000−1000 which is 0. TLST₅ will be used in the computation of the velocity during the sixth sample interval. The foregoing illustrates the typical operation of a servo system wherein the velocity computation is continually updated from one sample interval to the next, the precise time for each computation being the time between the last transition of the present and preceding sample intervals.

FIG. 9 is a flow chart which further aids in understanding the method used by the computer 36 to determine the velocity using the present invention. The computer 36 first determines in block 44 whether the absolute value of the position difference over the previous sample is or is not less than two, i.e. either "1" or "0". If the position difference value is 2 or greater, the computer 36 then computes the axis velocity in block 46 as the difference in axis position divided by the difference between the time of the last transitions of the current and the preceding sample interval.

If the computer 36 determines that the absolute value of the position difference over the previous sample interval is less than two, the computer 36 then proceeds to block 48 and attempts to select from the ambiguous interpretations of the contents of the sample interval position difference 33 and the time of last transition register 24. If the difference in position over the sample interval is zero proceeding to block 50, and the time of last transition is equal to the length of the sample interval proceeding to block 52, the computer 36 deduces that no quadrature transitions occurred during the interval. The velocity determined will depend upon whether the measured velocity is presently recorded as zero. If the measured velocity is presently recorded as zero, corresponding to block 54 in FIG. 8, then the measured velocity is left at zero. If the measured velocity is presently not zero, then the computer 36 in block 56 compares the period of the previous velocity computation with the period which would result if a transition had occurred at the last instant of the sample interval. If the latter period is greater, corresponding to block 58, the computer 36 deduces that the velocity is currently lower than the most recently computed velocity, and therefore records this estimated velocity. If the latter period is not greater, corresponding to block 60, the computer 36 deduces that the velocity is not currently lower than the most recently computed velocity, and therefore leaves the last measured velocity unchanged.

If the difference in position over the sample interval is zero and the time of last transition is determined in block 50 to be not equal to the length of the sample interval, the computer 36 in block 62 deduces that at least two transitions occurred and the algebraic sum is zero. For example, if the quadrature signals represented the Gray Code 01 at the start of the interval, and yet made the transition to 11 and then back to 01, the difference in position register 34 would hold zero at the end of the sample interval, but the time of last transition register 33 would hold the time that the transition from 11 to 01 occurred. The sequence could well have repeated many times, for example starting and ending at 01 but including 11, 01, 11, 01 and so forth. In all cases, the algebraic sum of transitions is zero, thus the position difference register 34 always holds zero at the end of the sample interval. After the computer 36 has so deduced that at least two transitions occurred summing algebraically to zero, the computer 36 then deduces that the velocity of the axis is also zero and the computer 36 so records the zero velocity.

If the computer 36 finds, upon reading the position difference register 33, that the absolute value of the difference in position over the sample interval is one, corresponding to block 64 in FIG. 9, then the computer 36 in block 66 must choose between two potentially ambiguous interpretations of the data. The obvious interpretation is that the computer 36 should compute the velocity as one divided by the time in seconds of the period between the last and second-to-last quadrature transitions. In most situations, the computation will be accurate. However, in the case in which electrical noise caused the transition to occur, the period can be extremely small and thus the computed velocity being the inverse of the period in this case would be extremely large.

The present invention allows the resolution of this ambiguity by causing the computer 36 to examine the sign of the difference in position over the sample interval and compare the sign to the quadrature transition immediately preceding the last quadrature transition. If the computer 36 determines that the sign of the difference in position over the sample interval is opposite to the sign of the difference in position over the sample interval immediately preceding the sample interval corresponding to block 68, then the computer 36 deduces that this transition is noise or the axis is starting from rest. In either case, the velocity is essentially zero and the computer 36 so records the zero value. If the sign, and therefore the direction of motion, is the same as the previous transition, corresponding to block 70 in FIG. 8, then the computer 36 computes the velocity as one divided by the period between the last and next-to-last quadrature transitions.

If the computer 36 were to use the position difference of one transition from the position difference register 33 and fail to distinguish that the transition was not in the same direction as the next-to-last quadrature transition, and a small time period was indicated by the time of last transition register 34, the computer 36 would then interpret this electrical noise-created quadrature transition as a very high axis velocity. This incorrectly measured velocity would adversely affect the quality of the servo control obtainable.

Multi-Axis Servo Control Apparatus

FIGS. 10 comprises a schematic diagram of a multi-axis servo control apparatus 20A embodying principles of the invention. The main components of apparatus 20A are surrounded with dashed lines in FIGS. 11A, 11B and 11C and are labeled with numbers corresponding to the numbered blocks shown in FIG. 10. These components are described as follows: The apparatus 20A is similar to apparatus 20 except that a multiplexer 72 is utilized which received eight axes of quadrature signals which are furnished as phase A and B inputs to a finite state machine 32.

The clock 30 utilizes a clock oscillator 73 that generates a continuous series of accurately timed pulses which synchronize the operation of the other blocks and allow time to be precisely measured. The finite state machine 32 comprises a binary counter 74 (e.g. 74LS169) that divides the timing pulses from the clock 30 into scan periods comprised of eight clock intervals, one for each axis of quadrature. A D-latch 75 (e.g. 74LS175) synchronizes the four signals, which are driven in such a way that the axis of quadrature being evaluated during each clock interval is uniquely identified. A scan period begins on the clock transition qualified by the assertion of the signal CLK/8.

Two eight stage shift registers 76 and 77 (e.g. 74LS164) delay the signals QASD and QBSD for eight clock intervals, such that when the signals QASD and QBSD represent the state of the quadrature for an axis as sampled during the current scan period, the signals QASDK and QBSDK represent the state of the quadrature for the same axis as sampled during the previous scan period.

The evaluation of quadrature transitions is carried out by the programmable logic component 78 (e.g. PAL16R8) at the rate of one axis per clock interval. The state of the quadrature for an axis as sampled during the current scan interval, represented by the signals QASD and QBSD, is compared to the state of the quadrature as sampled during the previous scan interval, represented by the signals QASDK and QBSDK. The two signals QP0 and QP1 encode the result of the evaluation. The four possible results are: 1. No transition has occurred; 2. A positive transition has occurred; 3. A negative transition has occurred; 4. An illegal transition, as defined by the rules for Gray Code, has occurred.

Using as inputs the signals QP0, QP1 and TBC*, the programmable logic component 78 (e.g. PAL16R8) generates the signals B-LO, QPBN* and QPBO*, which control the working registers of the position difference register pairs 34 and the signals TWE* and TSEL* which control the working registers of the time of last transition register pairs 33. The timing of these control signals is synchronized with the axis selection signals QA0, QA1 and QA2.

In the multiplexer 37, the phase A quadrature signals from the eight axes are inputs to a parallel load shift register 79 (e.g. 74LS166), and the phase B quadrature signals from the eight axes are inputs to a parallel load shift register 80 (e.g. 74LS166). At the beginning of each scan period, as identified by the assertion of the signal CLK/8, the state of the quadrature for all eight axes is parallel loaded into the shift registers 79 and 80 and the outputs QASD and QBSD represent the state of the quadrature for the first axis being evaluated. During subsequent clock intervals of the scan period, the signals QASD and QBSD represent the state of the quadrature for the other axes at the rate of one axis per clock interval.

The time source 31 (FIG. 11B) has three binary counters 81, 82 and 83 (e.g. 74LS169) that form an eleven bit counter which counts scan periods. A comparator 84 (e.g. 74LS688) asserts the signal TBC* when the eleven bit counter value is equal to the number of scan periods in one sample interval. On the clock transition qualified by the assertion of CLK/8 during which the signal TBC* is asserted; the three binary counters 81, 82 and 83 are loaded with the value one.

The signal QA3 driven by the QD output of the counter 81, is alternately asserted for one sample interval and deasserted for one sample interval. Transitions of the signal QA3 occur when the signal TBC* causes the counter to be loaded. The signal MA3 is the logical NOT of the signal QA3.

The position difference register pairs 33 (FIG. 11C) has three dual-port register files 85, 86 and 87 (e.g. AMD 29705A) that form a pair of 12-bit by 8-word register sets. The working set of registers is accessible for reading and writing using the B port of the register files, while the holding set of registers is accessible for reading using the A port of the register files. Three adders 88, 89 and 90 (e.g. 74LS283) form a 12-bit wide circuit whose output is equal to its input either incremented by one, decremented by one, or unchanged. A pair of tri-state buffers 91 and 92 form a 12-bit wide circuit which drives the inputs of the three adders 88, 89 and 90 with the value zero when the signal B-LO* is asserted through a gate 69. At all other times the inputs of the three adders 88, 89 and 90 are driven by the B port outputs of the dual port register files 85, 86 and 87. The outputs of the adders 88, 89 and 90 drive the B port input of the register files 85, 86 and 87. At the start of a sample period, the complementary signals QA3 and MA3 change state, causing the set of eight registers which were accessible to the B port of the dual-port register files to become accessible to the A port. Likewise, the set of registers accessible to the A port of the dual-port register files become accessible to the B port of the dual-port register files 85, 86 and 87. Thus, the working set of registers and the holding set of registers are exchanged.

During the first scan period of a sample interval, the signal B-LO* is asserted causing the inputs to the adders 88, 89 and 90 to be driven with the value zero. While the signals QA0, QA1 and QA2 select the working register for each axis, the signals QPBN* and QPB0* control the output of the adders 88, 89 and 90 producing a value of either plus one, minus one or zero, depending upon the evaluation of the quadrature signals for the selected axis.

During the remaining scan periods of a sample interval, the signal B-LO* is not asserted causing the inputs to the adders 88, 89 and 90 to be driven by the B port output of the dual-port register files 85, 86 and 87. While the signals QA0, QAI and QA2 select the working register for each axis, the signals QPBN* and QPB0 control the output of the adders 88, 89 and 90, adding either plus one, minus one or zero to the working register value, depending upon the evaluation of the quadrature signals for the selected axis.

The holding set of registers within the dual-port register files 88, 89 and 90 contain the final position difference values accumulated during the previous sample interval. The three signals MA0, MA1 and MA2 identify the register for a particular axis which is accessible at the A port of the dual-port register files 85, 86 and 87 when the output enable signal QPE* is asserted.

The time of last transition register pairs 34 has three dual-port register files 93, 94 and 95 (e.g. AMD 29705A) form a pair of 12-bit by 8-word register sets. The working set of registers is accessible for writing using the B port of the register files, while the holding set of registers is accessible for reading using the A port of the register files. Multiplexers 96, 97 and 98 (e.g. 74LS257) are controlled by the signal TSEL*. When TSEL* is asserted, the output of the multiplexers is a value equal to the number of scan periods in a sample interval. At all other times, the output of the multiplexers 96, 97 and 98 drive the B port inputs of the dual-port register files 93, 94 and 95.

At the start of a sample interval the working set of registers and the holding set of registers are exchanged in the same manner as the position difference register pairs 33.

During the first scan period of a sample interval, the signal TWE* is asserted enabling the value at the B port inputs of the dual-port register files 93, 94 and 95 to be written to the selected working register. While the signals QA0, QA1 and QA2 select the working register for each axis, the signal TSEL* selects the value to be written. If a quadrature transition for the selected axis has not occurred, TSEL* is asserted, causing the current time source value of one to be written to the selected working register. If a quadrature transition for the selected axis has occurred, TSEL* is not asserted, causing a value equal to the number of scan periods in a sample interval to be written to the selected working register.

During the remaining scan periods of a sample interval, the signal TSEL* is not asserted, causing the current time source value to be routed to the B port inputs of the dual-port 5 register files 93, 94 and 95. While the signals QA0, QA1 and QA2 select the working register for each axis, the signal TWE* is asserted when a quadrature transition for the selected axis has occurred, causing the current time source value to be written into the selected working register.

In the FIFO interface 35, at the request of the computer 36, a programmable logic component 99 (e.g. PAL16R6) controls the reading of the values stored in the holding register sets of the position difference register pairs 33, and the time of last transition register pairs 34, in a manner similar to that of a FIFO buffer. That is, repeated accesses by the computer 36 of the FIFO interface 35 result in the transfer of a time of last transition value followed by a position difference value for successive axes of quadrature, in an order identical to the order in which the axes were evaluated during the scan period. A pair of multiplexers 100 and 101 (e.g. 74LS257) are connected in such a way that the twelve bit data from the holding registers is sign extended to sixteen bits. Under control of the signal CA1, either the upper eight bits of the sixteen bit value drive the signals ID0 ... ID7 or the lower eight bits drive ID0 ... ID7.

During the first scan period of each sample interval, the assertion of the signal B-LO causes the programmable logic component 99 to assert the output IRQ* and set its remaining output signals to their initial condition. Assertion of the signal IRQ* notifies the computer 36 that a sample interval has been completed, and that accumulated time and position values are ready to be read. The initial condition of the other outputs of the programmable logic component 99 are QTE* asserted, TPE* and QPE* deasserted, and MA0, MA1 and MA2 selecting the holding registers for the first axis. The assertion of the signal QTE* enables the value in the selected holding register of the time of last transition register pairs to drive the inputs of the multiplexers 100 and 101.

The computer 36 issues a request to transfer a value by selecting the upper eight bits of value using the signal CAI and then asserting the signal CRD* which causes the TPE* output of the programmable logic device 99 to be asserted, enabling the outputs of the multiplexers 100 and 101. Also, the signal IRQ* is deasserted at this time. Next, the computer 36 changes CA1 to select the lower eight bits of the value and asserts CRD* for the second time, enabling the outputs of the multiplexers 100 and 101 in the same manner as before. Following the second assertion of CRD*, the programmable logic device 99 deasserts QTE* and asserts QPE* in preparation for transferring the selected position difference value to the computer 36. The same two step read process is repeated.

Following the transfer of the lower eight bits of the position difference value, the programmable logic device 68 switches MA0, MA1 and MA2 to select values for the next axis, and asserts QTE* and deasserts QPE* to prepare for the next transfer of data. The computer 36 continues to request data until values for all eight axes have been transferred.

In summary, the present invention provides a servo control apparatus that operates accurately and with efficiency even in an environment of electrical noise. If noise occurs while the axis is undergoing movement, the sequence of Gray Code signals may be 00, 01, 11, 01, 11, which indicates a temporary backward movement that would create an ambiguity and thus an erroneous velocity computation if not detected and compensated for. In the present invention such ambiguities are eliminated by the method and apparatus wherein only the algebraic sum of the quadrature transitions during each sample interval is utilized in computing the true axis velocity. In the situation where the axis is at rest and electrical noise occurs, the invention eliminates any misinterpretation of received signals by logic means to maintain true axis position and prevent any jump in the servo output shaft. In all cases, the invention maintains a high degree of precision of axis velocity and position for servo systems having one or several axes.

The preferred embodiment described herein is intended to be purely illustrative, and not limiting of the scope of the invention. Other embodiments and variations will be apparent to those skilled in the art and may be made without departing from the essence and scope of the invention as defined in the following claims.

What is claimed is:

1. A method for measuring the velocity of a servo shaft driven cyclically by a motor, without employing a tachometer, comprising the steps of:
   producing from movement of said shaft a pair of overlapping square-wave signals in quadrature with transitions expressible in Gray Code for each cycle;
   producing from a clock a large number of evenly spaced clock pulses and sub-dividing them into groups of pulses forming a sample interval;
   determining the algebraic sum of a series of quadrature transitions occurring during said sample interval;
   reading at the conclusion of each said sample interval a signed value representing the algebraic sum of the quadrature transitions occurring during said sample interval;
   reading and computing at the conclusion of each said sample interval the number of clock pulses between two selected quadrature transitions, each transition being the last transition of the two most recent sample intervals having transitions; and
   dividing the algebraic sum of the quadrature transitions occurring after a first said selected quadrature transition and including a second said selected quadrature transition by the number of clock pulses between said selected quadrature transitions.

2. The method as described in claim 1 including the steps of reading through a first-in, first-out memory a first time value when a last quadrature transition of a present sample interval occurred, subtracting from said first time value a second time value of the last transition of the preceding sample interval, thereby obtaining the number of clock pulses between the two selected quadrature transitions.

3. The method as described in claim 1 wherein said shaft is a reciprocating shaft.

4. The method as described in claim 2 including the step of first determining that the absolute value of the algebraic sum of the quadrature transitions occurring after said first selected quadrature transition and including second said selected quadrature transition is greater than or equal to two and then computing the velocity as the said algebraic sum of the quadrature transitions divided by the number of clock pulses between said selected quadrature transitions.

5. The method as described in claim 2 including the step of first determining if the said algebraic sum is zero and also if the number of clock pulses up the the last quadrature transition of the most recent said sample interval is equal to the number of clock pulses constituting the sample interval, thereby determining that no quadrature transitions occurred during the present interval and, if the measured velocity is presently recorded as zero, then leaving the measured velocity at zero thereby preventing the production of any output signal to the servo shaft.

6. The method as described in claim 5 including the steps of:
   determining that the most recently measured velocity is not presently zero;
   comparing the number of clock pulses between the two selected quadrature transitions of the most recently measured velocity with the number of clock pulses between the last quadrature transition of the most recently measured velocity and the end of the current sample interval; and
   if the latter number of clock pulses is greater, determining that the velocity is currently lower than the most recently measured velocity and computing the velocity by dividing one having the algebraic sign of the most recently measured velocity by the said latter number of clock pulses.

7. The method as described in claim 6 including the steps of determining that the velocity is not currently lower than the most recently measured velocity and thereafter leaving the last measured velocity unchanged.

8. The method as described in claim 5 including the step of determining that the number of clock pulses to the last quadrature transition of the most recent said sample interval is not equal to the length of the sample interval, thereby determining that two or more quadrature transitions algebraically summing to zero occurred during the sample interval, thereby determining that the velocity is zero, thereby setting the measured velocity to zero.

9. The method as described in claim 1 including the steps of:
   determining that the absolute value of the algebraic sum of the quadrature transitions occurring during the most recent sample interval is one; and
   determining if the sign of the most recent algebraic sum of the quadrature transitions is the same as the sign of the algebraic sum of the quadrature transitions of the previous sample interval; and if is recording zero velocity for the current sample interval.

10. The method described in claim 9 including the steps of:
   determining that the sign of the most recent algebraic sum of the quadrature transitions is the same as the sign of the algebraic sum of the quadrature transitions of the previous sample interval; and computing the velocity as one having the algebraic sign of the most recently measured velocity divided by the number of clock pulses between said selected quadrature transitions.

11. Apparatus for measuring the velocity of a servo shaft driven cyclically by a motor, without employing a tachometer comprising:
   quadrature means for producing from movement of said shaft a pair of overlapping square-wave signals in quadrature with transitions expressible in Gray Code for each cycle;
   means for continuously producing a large number of evenly spaced clock pulses and for sub-dividing them into a group of pulses forming a series of consecutive sample intervals;
   first register means for storing a signed value representing the algebraic sum of the quadrature transitions occurring during a sample interval;
   second register means for storing the number of clock pulses between the start of a sample interval and the last quadrature transition in the same sample interval;
   reading and computing means for determining the number of clock pulses between two selected quadrature transitions, each selected quadrature transition being the last quadrature transition of the two most recent sample intervals having transitions; and
   computer means for dividing the same algebraic sum of the quadrature transitions occurring after a first selected quadrature transition and including a second selected quadrature transition by the number of clock pulses between said selected quadrature transitions.

12. The apparatus of claim 11 comprising first-in, first-out member means connected to outputs from said first and second register means for determining the number of clock pulses between selected quadrature transitions and furnishing same to said computer means.

13. The apparatus as described in claim 11 wherein said servo shaft is a reciprocating shaft.

14. The apparatus as described in claim 11 wherein said computer means includes means for first determining that the absolute value of the algebraic sum of the quadrature transitions occurring after said first selected quadrature transition and including second said selected quadrature transition is greater than or equal to two; and means for computing the velocity as the said algebraic sum of the quadrature transitions divided by the number of clock pulses between said selected quadrature transitions.

15. The apparatus as described in claim 11 wherein said computer means includes means for first determining that the sum of the quadrature transitions occurring after said first selected quadrature transition and including second said selected quadrature transition is zero and means for determining if the number of clock pulses to the last quadrature transition of the most recent said sample interval is equal to the number of clock pulses constituting the sample interval, thereby determining that no quadrature transitions occurred during the present interval and, if the measured velocity is presently recorded as zero, then leaving the measured velocity at zero thereby preventing the production of any output signal to the servo shaft.

16. The apparatus as described in claim 15 wherein said computer means further includes:

means for determining that the most recently measured velocity is presently not zero;

means for comparing the number of clock pulses between the two selected quadrature transitions of the most recently measured velocity with the number of clock pulses between the last quadrature transition of the most recently measured velocity and the end of the current sample interval; and if the latter number of clock pulses is greater, most for determining that the velocity is currently lower than the most recently measured velocity and means for computing the velocity as one having the algebraic sign of the most recently measured velocity divided by the said latter number of clock pulses.

17. The apparatus described in claim 15 wherein said computer means further includes means for determining that the velocity is not currently lower than the most recently measured velocity and thereafter leaving the last measured velocity unchanged.

18. The apparatus described in claim 15 wherein said computer means further includes means for determining that the number of clock pulses to the last quadrature transition of the most recent said sample interval is not equal to the number of clock pulses constituting the sample interval, thereby determining that two or more quadrature transitions algebraically summing to zero occurred during the sample interval, thereby determining that the velocity is zero, thereby setting the measured velocity to zero.

19. The apparatus as described in claim 11 wherein said computer means comprises:

means for determining that the absolute value of the algebraic sum of the quadrature transitions occurring during the most recent sample interval is one;

means for determining if the sign of the most recent algebraic sum of the quadrature transitions is opposite to the sign of the algebraic sum of the quadrature transitions of the previous sample interval and if so for determining that this last quadrature transition is noise or that the axis is starting from rest and that the true velocity is zero; and means for thereafter recording zero velocity.

20. The apparatus as described in claim 19 wherein said computer means comprises:

means for determining that the sign of the most recent algebraic sum of the quadrature transitions is the same as the sign of the algebraic sum of the quadrature transitions of the previous sample interval;

means for computing the velocity as one having the algebraic sign of the most recently measured velocity divided by the number of clock pulses between said selected quadrature transitions.

21. The apparatus of claim 11 comprising first-in first-out memory means and multiplexing means for use with a plurality of said shafts for sending signals from each shaft and latching means in said memory means for linking the appropriate data with the correct said shaft.

22. A multi-axis servo control apparatus for measuring the velocity of each of a plurality of servo shafts providing output quadrature signals for each axis, said control apparatus comprising:

clock means for generating continuous clock intervals;

counter means connected to said clock means for dividing the clock intervals into scan periods and further into longer sample intervals for each axis of quadrature;

a finite state machine including means for synchronizing, identifying and latching received signals representative of the Gray Code of each quadrature axis, means for delaying said latched signals for a preselected number of clock intervals to provide a first group of latched signals representing the state of each quadrature axis during a current scan period and a second group of latched signals representative of the corresponding state of each quadrature axis as sampled during the immediate previous scan period, and a programmable logic means for evaluating quadrature transitions at a preset rate per clock interval by comparing the state of the Gray Code quadrature signals for each axis as sampled during the current scan period with the state of the Gray Code quadrature signals for the corresponding axis sampled during the previous scan period;

position difference register means, one corresponding to each of the plurality of servo shafts, connected to said finite state machine means for storing the algebraic sum of the Gray Code quadrature transitions of the corresponding axis as evaluated by said finite state machine means between the start and end of the most recent sample interval;

time of last transition register means, one corresponding to each of the plurality of servo shafts, connected to said finite state machine means for storing the time of the most recent Gray Code quadrature transition of the corresponding axis as evaluated by said finite state machine means between the start and end of the most recent sample interval;

means for reading signals from said register means; and means for utilizing the signals from both said register means for each of the plurality of servo shafts to compute a velocity for each most recent sample interval of each axis.

23. The control apparatus of claim 22 including:

multiplexer means for selecting and presenting quadrature signals from said plurality of servo shafts to said finite state machine in a preselected order.

24. The control apparatus of claim 22 wherein said synchronizing means comprises a first-in, first-out interface means.

25. The control apparatus of claim 23 wherein said multiplexer means includes means for continuously receiving and transmitting quadrature data from up to eight servo shafts in a repetitive preselected sequential order.

26. The control apparatus of claim 22 wherein said position difference register comprises a working set of register files connected to a holding set of register files for retaining the final position difference values accumulated during the previous sample interval and means for exchanging data between said files during each sample interval.

27. The control apparatus of claim 22 wherein said time of last transition register comprises a working set of register files connected to a holding set of register files for retaining the time of each quadrature transition during the previous sample interval, and means for exchanging data between said register files during each sample interval.

* * * * *

UNITED STATES PATENT AND TRADEMARK OFFICE
CERTIFICATE OF CORRECTION

PATENT NO. : 5,062,064
DATED      : October 29, 1991
INVENTOR(S) : Paul Sagues and Vernon E. Muhr It is certified that error appears in the above-identified patent and that said Letters Patent is hereby corrected as shown below:

On the title page, Item [56]:
Under Reference Cited U.S. Patent Document "4,369,884" should read --4,639,884--.
Column 1, line 24, "transition" should read --transitions--.
Column 6, line 58, "occur" should read --occur.--.
Column 7, line 20, "rest" should read --rest.--.
Column 7, line 32, "counter" should read --counter 31--.
Column 9, line 16, "computer 35" should read --computer 36--.
Column 17, line 12, "pulses up the the last" should read --pulses up to the last--.
Column 17, line 60, "and if is" should read --and if so--.
Column 18, line 30, "the same" should read -- the said--.
Column 19, line 9, "greater, most for" should read --greater, means for--.

Signed and Sealed this

Sixth Day of April, 1993

*Attest:*

STEPHEN G. KUNIN

*Attesting Officer*   *Acting Commissioner of Patents and Trademarks*